(12) United States Patent
Gottfried

(10) Patent No.: US 10,203,235 B1
(45) Date of Patent: Feb. 12, 2019

(54) MEASURING DEVICE AND METHODS OF USING THEREOF

(71) Applicant: Betty A. Gottfried, Adventura, FL (US)

(72) Inventor: Betty A. Gottfried, Adventura, FL (US)

(*) Notice: Subject to any disclaimer, the term of this patent is extended or adjusted under 35 U.S.C. 154(b) by 0 days.

(21) Appl. No.: 15/278,163

(22) Filed: Sep. 28, 2016

Related U.S. Application Data

(60) Provisional application No. 62/234,540, filed on Sep. 29, 2015.

(51) Int. Cl.

| | |
|---|---|
| *G01F 11/24* | (2006.01) |
| *G01F 11/00* | (2006.01) |
| *G01F 11/26* | (2006.01) |
| *B65D 41/04* | (2006.01) |
| *B65D 47/06* | (2006.01) |
| *B65D 51/24* | (2006.01) |

(52) U.S. Cl.
CPC ............ *G01F 11/003* (2013.01); *B65D 41/04* (2013.01); *B65D 47/06* (2013.01); *B65D 51/245* (2013.01); *G01F 11/261* (2013.01)

(58) Field of Classification Search
CPC .... G01F 11/003; G01F 11/261; G01F 11/268; G01F 11/46; G01F 11/00; G01F 11/24; B65D 51/245; B65D 47/06; B65D 41/04; A47G 19/24
USPC ................ 222/370, 452, 548, 305, 439, 284
See application file for complete search history.

(56) References Cited

U.S. PATENT DOCUMENTS

| | | | | |
|---|---|---|---|---|
| 4,832,235 | A | * | 5/1989 | Palmer .................. A47G 19/24 222/370 |
| 5,240,142 | A | | 8/1993 | Reid |
| 5,465,871 | A | | 11/1995 | Robbins, III |
| 5,495,962 | A | * | 3/1996 | Nomura ................. A47G 19/34 222/240 |
| 5,509,582 | A | | 4/1996 | Robbins, III |
| 5,601,213 | A | | 2/1997 | Daniello |
| 5,860,563 | A | | 1/1999 | Guerra |

(Continued)

FOREIGN PATENT DOCUMENTS

DE 3785051 T2 7/1993
DE 102013102133 B4 10/2014

*Primary Examiner* — Patrick M Buechner
*Assistant Examiner* — Robert Nichols, II
(74) *Attorney, Agent, or Firm* — GFD Patents LLC; Gerald F. Dudding

(57) ABSTRACT

A device for measuring and dispensing predetermined volumes of dry powdered or dry granular materials, and methods for using the device are disclosed. The device comprises: a rotatable cap, a rotatable measuring cylinder, a rotatable cylindrical fill ring; and a base cylinder, such that the rotatable cap, the rotatable measuring cylinder, the rotatable cylindrical fill ring; and the base cylinder are mechanically or physically attached or joined, while preserving their operational, rotatable, releasable, or stationary functionality. A rotatable leaf partition and a blocker form a measuring volume between them within a predetermined volume from ¼ teaspoon (tsp.), ½ tsp, 1 tsp, or 1 tablespoon (tbsp.). A minimum measuring volume may be formed in a hollow cylindrical measuring compartment by creating a cavity that provides reproducible measurement of the granules or powders within +/−10% by volume.

20 Claims, 13 Drawing Sheets

(56) References Cited

U.S. PATENT DOCUMENTS

| | | | |
|---|---|---|---|
| 6,929,159 B1 * | 8/2005 | Haig | B65D 47/265 |
| | | | 141/18 |
| 7,959,031 B2 | 6/2011 | Ranney | |
| 8,028,865 B2 | 10/2011 | DeJonge | |
| 2014/0033658 A1 | 2/2014 | Habraken et al. | |
| 2014/0203050 A1 | 7/2014 | Blackburn | |

* cited by examiner

MEASURING DEVICE AND METHODS OF USING THEREOF

FIELD OF THE INVENTION

The present invention relates generally to devices used for measuring and dispensing selected, predetermined amounts of dry powdered or dry granular materials. More specifically, the present invention relates to measuring and dispensing selected, predetermined amounts of fine, dry powdered and granular materials between ⅛ teaspoon (0.62 ml) and 1 tablespoon (15 ml).

BACKGROUND

There is a need for an apparatus for measuring and dispensing selected, predetermined amounts of dry powdered or dry granular materials.

SUMMARY OF THE INVENTION

A first aspect of the present invention provides a device adapted for measuring or pouring flowable particulates (2), e.g., granules or powders. The device (1) comprises a rotatable cap (3), a rotatable measuring cylinder (11), a rotatable cylindrical fill ring (12); and a base cylinder (5). The rotatable cap (3) comprises superior surface (296), an inferior surface (310), and a pour opening (23) and/or a grid opening (25), therein. The inferior surface (310) comprises a compressible fastener (18), seamlessly extending from a center (80) of the inferior surface (310) of the rotatable cap (3) along a longitudinal axis (75) of the device (1). The rotatable cap (3), rotatable measuring cylinder (11), and rotatable cylindrical fill ring (12), and the base cylinder (5) are rotatably coupled by the compressible fastener (18) having been sequentially inserted through the plurality of swivel holes (17) located in the center (83) of the rotatable cap (3), the rotatable measuring cylinder (11), the rotatable cylindrical fill ring (12), and the base cylinder (5). The rotatable measuring cylinder (11) comprises a superior surface (300) between the inferior surface (310) of the rotatable cap (3) and a hollow cylindrical measuring compartment (79) of the rotatable measuring cylinder (11). The superior surface (300) is circumferentially coextensive with a wall (87) of the hollow cylindrical measuring compartment (79). An opening (22) intercommunicates with the pour opening (23) of the rotatable cap (3) and the hollow cylindrical measuring compartment (79). One of a plurality of swivel holes (17) defines an opening in a center (83) of each component of the device (1). A bearing (86) may seamlessly extend from an inferior surface (400) of the superior of the rotatable cylinder (11) around the swivel hole (17) in the center (83) of the rotatable measuring cylinder (11), for first insertion of the distal end (90) of the compressible fastener (18). The hollow cylindrical measuring compartment (79) comprises a leaf partition (101), radiating from the bearing (86) or opening in the center (83) of the rotatable measuring cylinder (11), extending through a measuring volume (69) and fixedly coupled to the wall (87) of the hollow cylindrical measuring compartment (79), such that the leaf partition (101) revolves about the compressible fastener (18) when the rotatable measuring cylinder (11) is rotated. An outer wall (38) of the rotatable measuring cylinder (11) is marked with a volume selector notch or stop (67), such that the leaf partition (101) is positioned in the hollow cylindrical measuring compartment (79) corresponding to a selected volume for dispensing the measured flowable particulates (2), e.g., granules or powders. The walls (87, 38), the hollow cylindrical measuring compartment (79) and the bearing (86) are concentric. The rotatable cylindrical fill ring (12) comprises an outer wall (89) having an exterior surface (91). The exterior surface (91) of the outer wall (89) of the rotatable cylindrical fill ring (12) is indexed volumetrically, such that a volume to be measured can be selected by aligning the volume selector notch or stop (67) with the volumetric index (107) on the exterior surface (91) of an outer wall (89) of the rotatable cylindrical fill ring (12). The rotatable cylindrical fill ring (12) further comprises an opening (95) in the rotatable cylindrical fill ring (12) which intercommunicates with the hollow rotatable measuring cylinder (11) and an opening (97) in a base cylinder (5) between the opening (10) in a neck (14) of a reservoir (9). The rotatable cylindrical fill ring (12) further comprises one of the plurality of swivel holes (17), that defines an opening in a center (83) of the rotatable cylindrical fill ring (12) for second insertion of a distal end (90) of the compressible fastener (18). The rotatable cylindrical fill ring (12) has a superior surface (320) underlying the rotatable measuring cylinder (11). The superior surface (320) comprises a blocker (49) having a solid shape extending from the superior surface (320) of the rotatable cylindrical fill ring (12) into rotatable measuring cylinder (11). The blocker (49) has a proximal side (103) and a distal side (105) relative to the opening (95) in the superior surface (320). The leaf partition (101) traverses the rotatable measuring cylinder (11) between the distal side (105) of the blocker (49) and the proximal side (103) of the blocker (49) when the rotatable measuring cylinder (11) is rotated, such that the volume selector notch or stop (67) is aligned with the selected volumetric index (107). The base cylinder (5) comprises an opening (97) in the base cylinder (5) that intercommunicates between the opening (95) in the rotatable cylindrical fill ring (12) and the reservoir (9). The base cylinder (5) further comprises one of the plurality of swivel holes (17) that define an opening in a center (83) of the base cylinder (5) for third insertion of distal end (90) of the compressible fastener (18).

A second aspect of the present invention provides a method for measuring flowable particulates, comprising: providing the device of claim 1; adjusting the rotatable measuring cylinder and the fill ring to the desired measurement; rotating the rotatable cap, such that the opening in the superior surface does not intercommunicates with the pour opening; rotating the base cylinder, such that the opening in the inferior side intercommunicates between the opening in the inferior side of the rotatable fill ring and the reservoir; tilting the device, so that the flowable particulates move into the rotatable measuring cylinder; rotating the base cylinder, such that the opening in the inferior side does not intercommunicate between the opening in the inferior side of the rotatable fill ring and the reservoir; rotating the rotatable cap, such that the opening in the superior surface does intercommunicate with the pour opening; and pouring the flowable particulates out through the pour opening.

A third aspect of the present invention provides a method of cleaning and re-assembling a device, comprising: providing the assembly device of claim 1: removing the rotatable cap's compressible fastener from the plurality of swivel holes of the device; detaching the rotatable measuring cylinder from the fill ring; detaching the fill ring from the base cylinder; cleaning the rotatable cap, the rotatable measuring cylinder, the fill ring, and the base cylinder; operably coupling the fill ring to the base cylinder; operably coupling rotatable measuring cylinder to the fill ring, and operably coupling the rotatable cap's compressible fastener to the plurality of swivel holes of the device.

BRIEF DESCRIPTION OF THE FIGURES

The features of the invention are set forth in the appended claims. The invention itself, however, will be best understood by reference to the following detailed description of an illustrative embodiment when read in conjunction with the accompanying drawings, wherein:

DETAILED DESCRIPTION OF EMBODIMENTS OF THE INVENTION

Definitions

Figure 1:
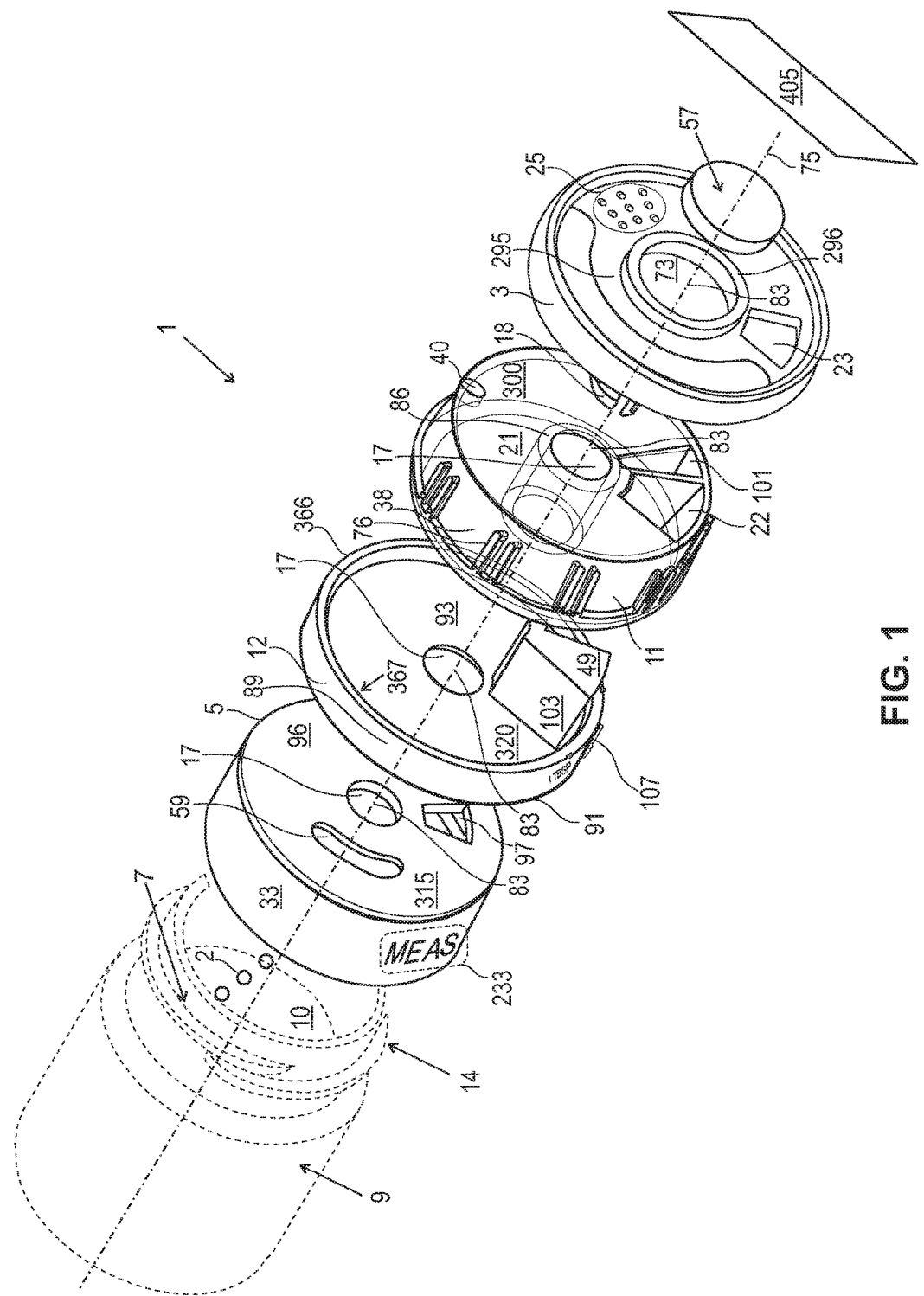
FIG. 1 depicts a side elevation view of components of a measuring device, before assembly, in accordance with embodiments of the present invention.

As used herein, unless otherwise defined, the term "operably coupled" or "operably coupling," rotatably coupled" or rotatably coupling", "releasably coupled" or "releasably coupling", "fixedly coupled" or "fixedly coupling", "compressibly coupled" or "compressibly coupling" mean mechanically or physically attaching or joining components of the device 1, while preserving their operational, rotatable, releasable, or stationary functionality. For example, unless otherwise defined, "rotatably coupled" or "rotatable coupling" and "compressibly coupled or "compressible coupling" is defined as forming a mechanical, physical union wherein the components being joined may freely rotate on a releasable coupling 24, wherein the compressible fastener 18, the magnet 57, the plurality of swivel holes 17, the semicircular concavities 39, 59, the buttons 40, 63, and the internal threads 7 are the releasable coupling 24.

As used herein, unless otherwise defined, the terms "distal side 105 of blocker 49" and "proximal side 103 of blocker 49" refer to the proximity of the sides 105, 103 to an opening 97 in the base cylinder 5, wherein the "proximal side 103 of blocker 49" is closer to the opening 97 than the "distal side 105 of blocker 49" when the rotatable measuring cylinder 11 and rotatable cylindrical fill ring 12 are assembled.

As used herein, unless otherwise defined, the singular forms "a", "an", and "the" include plural references unless the context clearly dictates otherwise. Thus, for example, reference to "a swivel hole" includes a plurality of such swivel holes 17, and so forth.

As used herein, unless otherwise defined, the term "superior" defines the side of the part in question that faces the top of the device when the device is assembled, and the term "inferior" defines the side of the part in question that faces the spice reservoir.

One objective is to provide a device for measuring and dispensing selected, predetermined amounts of dry powdered or dry granular materials. More specifically, the present invention relates to measuring and dispensing selected, predetermined amounts of fine, dry powdered and granular materials between ⅛ teaspoon (0.62 ml) and 1 tablespoon (15 ml).

A second objective is to provide a measuring rotatable cap which dispenses an exact measurement of dry powdered and granular materials, wherein the range of predetermined amounts of fine, dry powdered and granular materials between ⅛ teaspoon (0.62 ml) and 1 tablespoon (15 ml).

A third objective is to provide a device which is easily and removably attachable to a shelf for storage when the device is not in use.

FIG. 1 depicts a side elevation view of components of a measuring device 1, the components being oriented for assembly along a longitudinal axis 75 of the device 1. The device 1 is adapted for measuring or pouring flowable particulates 2, e.g., granules or powders. The device 1 comprises a rotatable cap 3, a rotatable measuring cylinder 11, a rotatable cylindrical fill ring 12; and a base cylinder 5.

The rotatable cap 3 comprises superior surface 296, and inferior surface 310 of the cap 3, and a pour opening 23 and/or a grid opening 25, therein. The inferior surface 310, depicted in FIG. 2B, comprises a compressible fastener 18, seamlessly extending from a center 80 of the inferior surface 310 of the rotatable cap 3 along the longitudinal axis 75 of the device 1.

In one embodiment the compressible fastener 18 is solid at a proximal end 85 and splits into outwardly flared prongs 20 at a distal end 90 that form a releasable coupling 24 when the outwardly flared prongs 20 are inserted into the plurality of swivel holes 17. Here, the proximal end 85 of the compressible fastener 18 is closer to the center 80 of the inferior surface 310 of the rotatable cap 3 along the longitudinal axis 75 of the device 1 than the outwardly flared prongs 20 at a distal end 90 of the compressible fastener 18.

The rotatable measuring cylinder 11 comprises a superior surface 300 between the inferior surface 310 of the rotatable cap 3 and a hollow cylindrical measuring compartment 79 of the rotatable measuring cylinder 11. The superior surface 300 is circumferentially coextensive with a wall 87 of the hollow cylindrical measuring compartment 79. An opening 22 intercommunicates with the pour opening 23 and/or the grid opening 25 of the rotatable cap 3 and the hollow cylindrical measuring compartment 79. One of a plurality of swivel holes 17 defines an opening in a center 83 of each component of the device 1.

Figure 3A:
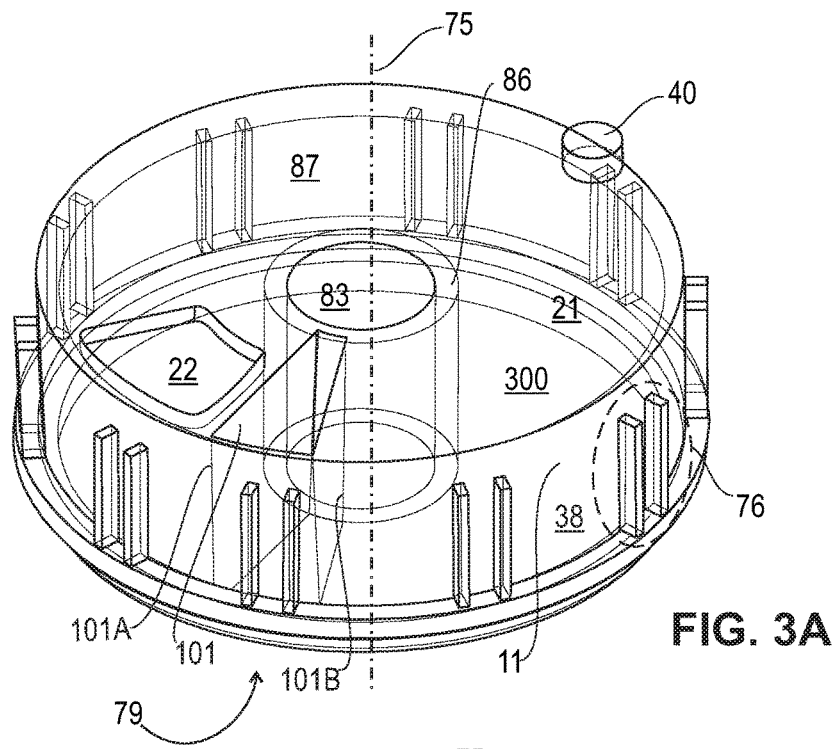
FIGS. 3A and 3B depict superior and inferior views of a rotatable measuring cylinder, in accordance with embodiments of the present invention.
Figure 3B:
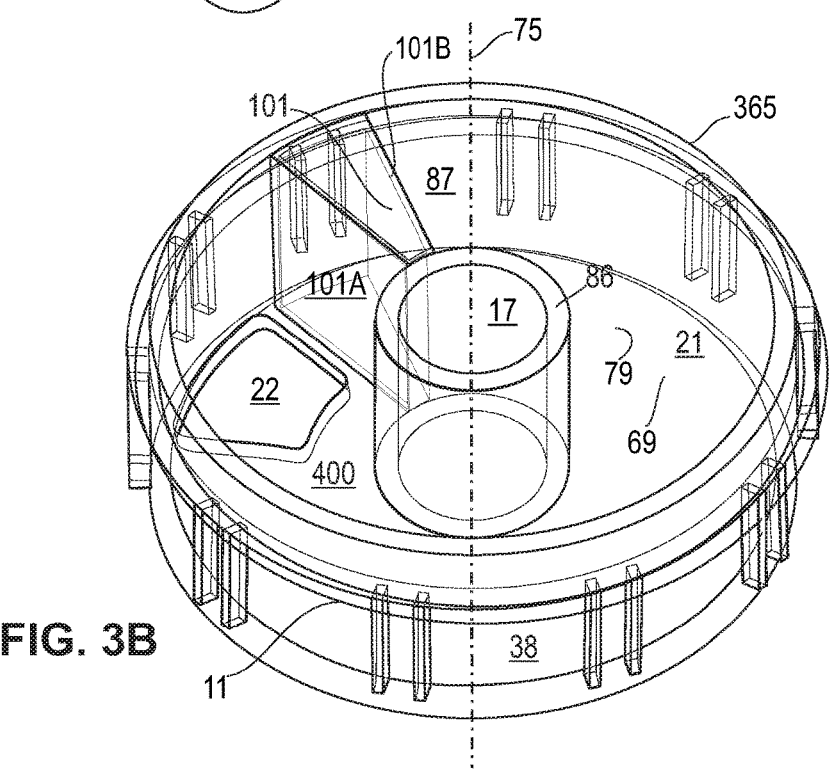

A bearing 86, depicted in FIG. 3B, may seamlessly extend from an inferior surface 400 of the rotatable cylinder 11 around the swivel hole 17 in the center 83 of the rotatable measuring cylinder 11, for first insertion of the distal end 90 of the compressible fastener 18.

The hollow cylindrical measuring compartment 79, shown in FIG. 3B, comprises a leaf partition 101, radiating from the bearing 86 or opening in the center 83 of the rotatable measuring cylinder 11, extending through a measuring volume 69 and fixedly coupled to the wall 87 of the hollow cylindrical measuring compartment 79, such that the leaf partition 101 revolves about the compressible fastener 18 when the components of the measuring device 1 is assembled and the rotatable measuring cylinder 11 is rotated independently of the rest of the measuring device 1.

An outer wall 38 of the rotatable measuring cylinder 11 is marked with a volume selector notch or stop 67, such that the leaf partition 101 is positioned in the hollow cylindrical measuring compartment 79 corresponding to a selected volume for dispensing the measured flowable particulates 2, e.g., granules or powders. The walls 87, 38, the hollow cylindrical measuring compartment 79 and the bearing 86 may be concentric.

The rotatable cylindrical fill ring 12 comprises an outer wall 89 having an exterior surface 91. The exterior surface 91 of the outer wall 89 of the rotatable cylindrical fill ring 12 is indexed volumetrically, such that a volume to be measured can be selected by aligning the volume selector notch or stop 67 with the volumetric index 107 on the exterior surface 91 of an outer wall 89 of the rotatable cylindrical fill ring 12. The rotatable cylindrical fill ring 12 further comprises an opening 95 in the rotatable cylindrical fill ring 12 which intercommunicates with the hollow rotatable measuring cylinder 11 and an opening 97 in a base cylinder 5 between the opening 10 in a neck 14 of a reservoir 9. The rotatable cylindrical fill ring 12 further comprises one of the plurality of swivel holes 17, that defines an opening in a center 83 of the rotatable cylindrical fill ring 12 for second insertion of a distal end 90 of the compressible fastener 18.

The rotatable cylindrical fill ring 12 has a superior surface 320 underlying the rotatable measuring cylinder 11. The superior surface 320 comprises a blocker 49 having a solid shape superior surface 320 of the rotatable cylindrical fill ring 12 into extending from the rotatable measuring cylinder 11. The blocker 49 has a proximal side 103 and a distal side 105 relative to the opening 95 in the superior surface 320. The leaf partition 101 traverses the rotatable measuring cylinder 11 between the distal side 105 of the blocker 49 and the proximal side 103 of the blocker 49 when the rotatable measuring cylinder 11 is rotated, such that the volume selector notch or stop 67 is aligned with the selected volumetric index 107.

The base cylinder 5 comprises an opening 97 in the base cylinder 5 that intercommunicates between the opening 95 in the rotatable cylindrical fill ring 12 and the reservoir 9. The base cylinder 5 further comprises one of the plurality of swivel holes 17 that define an opening in a center 83 of the base cylinder 5 for third insertion of distal end 90 of the compressible fastener 18.

The device 1 may include a reservoir 9 coupled to the base cylinder 5. The reservoir 9 comprises opening 10 in the neck 14. In one embodiment, the reservoir 9 and the device 1 may be operably coupled by coupling the neck 14 of the reservoir 9 and the base cylinder 5 by screwing the threads 7 inside wall 35 of the base cylinder 5 onto corresponding threads 7 along neck 14 of the reservoir 9. Flowable particulates 2, e.g., granules or powders, e.g., e.g., spices or edible condiments, e.g., table salt, pepper, food seasoning, e.g. garlic powder may be stored indefinitely in the reservoir 9 after coupling it to the base cylinder 5 without spoiling because the combination of the reservoir 9 and device 1 may be isolated from contact with the outside environment by rotating the rotatable cap 3, such that the pour opening 23 and grid opening 25 are closed to the outside. The reservoir 9 may be a commercially available spice or condiments container.

Figure 2A:
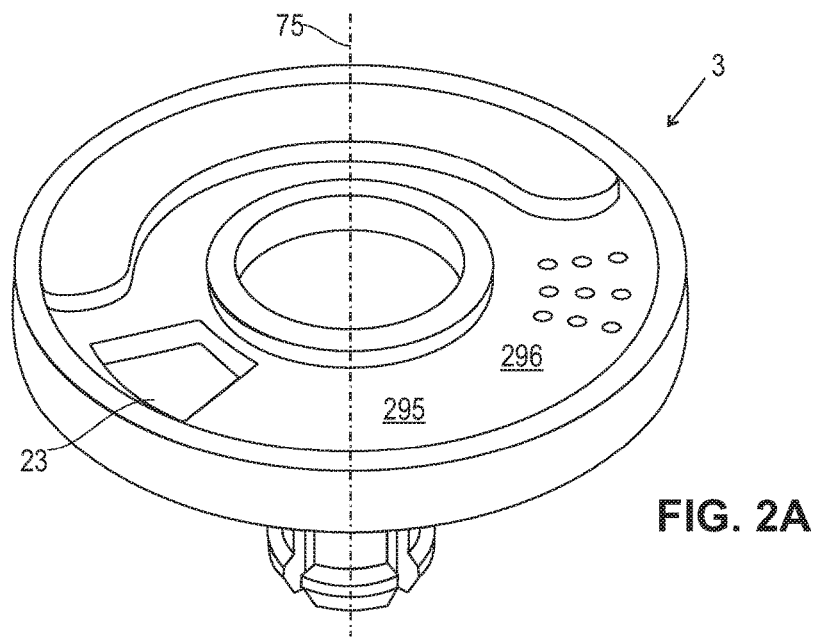
FIGS. 2A and 2B depict superior and inferior views of a rotatable cap, in accordance with embodiments of the present invention.
Figure 2B:
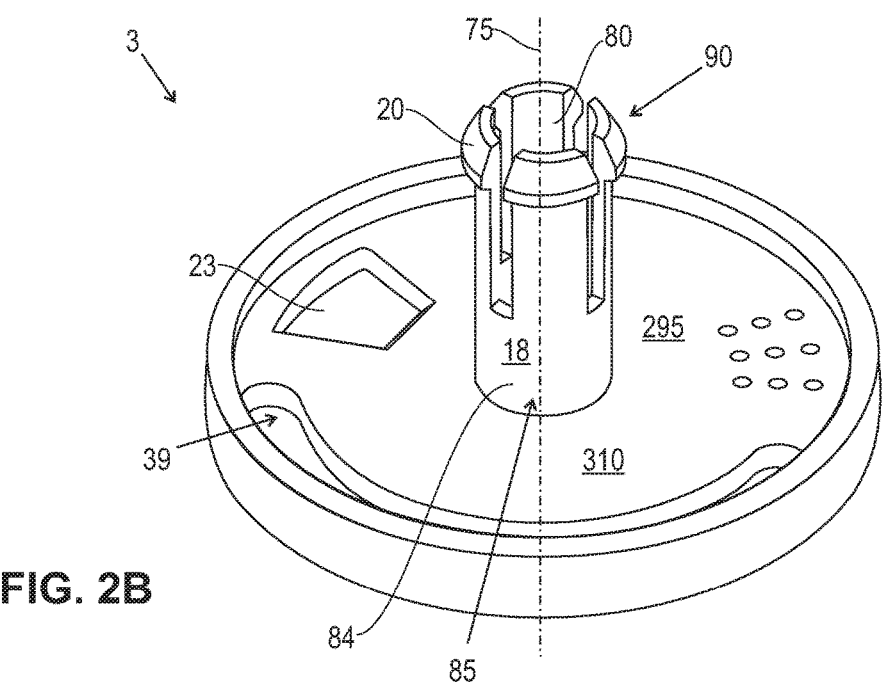

FIGS. 2A and 2B depict superior and inferior views of the rotatable measuring cap 3. A compressible fastener 18 seamlessly extends from a center 80 of the inferior surface 310 of the rotatable cap 3 along the longitudinal axis 75 of the device 1. The compressible fastener 18 comprises an elongated stem 84 having a proximal end 85 and a distal end 90 that splits into outwardly flared prongs 20 that forms a releasable coupling 24 for insertion into the plurality of swivel holes 17, depicted in FIGS. 5C and 9A.

FIG. 2B depicts an inferior view of the rotatable cap 3. In one embodiment, the rotatable cap 3 has a grid opening 25. The rotatable cap 3 has a semicircular concavity 39 on the inferior surface 310 of the rotatable cap extending approximately 150 degrees along said rotatable cap's outer circumference. An opening 22, depicted in FIGS. 3A and 3B, infra, in the rotatable measuring cylinder 11 may be aligned with either the pour opening 23 or the grid opening 25 by circumferentially sliding a button 40, e.g. a convex circular button, in the semicircular concavity 39 running circumferentially along the inferior surface 310. Alternatively the button 40 may be positioned in the semicircular concavity 39, such that the pour opening 23 may be closed by reversing the direction of the circumferentially sliding button 40.

FIGS. 3A and 3B depict superior and inferior views of a rotatable measuring cylinder 11. The rotatable measuring cylinder 11 has a superior surface 300 adjacent the inferior surface 310 of the rotatable cap 3. The superior surface 300 is circumferentially coextensive with a wall 87 of the rotatable measuring cylinder 11. An opening 22 intercommunicates with the pour opening 23 of the rotatable cap 3 and the hollow cylindrical measuring compartment 79 of the rotatable measuring cylinder 11. One of the plurality of swivel holes 17 defines an opening in a center 83 of the superior surface 300. A bearing 86 may surround the swivel hole 17, for first insertion of the distal end 90 of the compressible fastener 18.

The hollow cylindrical measuring compartment 79 is partitioned by a leaf partition 101 radiating from either the opening in the center 83 of the superior surface 300 or the bearing 86 and fixedly couples to the wall 87 of the rotatable measuring cylinder 11, such that the measuring volume 69 increases in a range from about ⅛ teaspoon to about 1 tablespoon when the leaf partition 101 revolves around the compressible fastener 18 when the rotatable measuring cylinder 11 is rotated. A volume selector notch or stop 67 is marked on the outer wall 38 so that the position of the leaf partition 101 corresponding to a measured volume may be selected. In one embodiment, the outer wall 38 and the bearing 86 may be concentric.

FIG. 3A depicts an embodiment in which the leaf partition 101 comprises a leaf 101A that is proximal to the opening 22 of the rotatable cap 3, and a leaf 101B that is distal to the opening 22.

Referring to FIG. 1, depicting the device 1, before assembly, the device 1 comprises a rotatable measuring cylinder 11. The rotatable measuring cylinder 11 has a superior surface 300 opposite the inferior surface 310 of the rotatable cap 3, as depicted in FIG. 2B. The superior surface 300 is circumferentially coextensive with a wall 87 of the rotatable measuring cylinder 11. An opening 22 intercommunicates with the pour opening 23 of the rotatable cap 3 and a hollow measuring volume 69, depicted in FIG. 3B. One of the plurality of swivel holes 17 defines an opening in the center 83 of the superior surface 300.

In one embodiment, the rotatable measuring cylinder 11 has ribs 76 around the perimeter to provide a gripping surface to aid a user when rotating the rotatable measuring cylinder 11.

In one embodiment, a leaf partition 101 radiates from the perimeter of the opening in the center 83 of the superior surface 300 of the rotatable measuring cylinder 11.

Referring to FIG. 1, depicting the device 1, before assembly, the device 1 comprises a rotatable cylindrical fill ring 12. The rotatable cylindrical fill ring 12 has an outer wall 89 with an exterior surface 91. Indices 107 and corresponding notches or stops 66, depicted in FIG. 9B, setting off a range of desired measure or pour volumes for flowable particulates 2, e.g., granules or powders, from ⅛ teaspoon-1 tablespoon on the exterior surface 91 of the outer wall 89 of the rotatable cylindrical fill ring 12, may be aligned with a corresponding volume selector notch or stop 67, depicted in FIG. 9B, setting off a position of the leaf partition 101, such that the measuring volume 69 corresponds to the selected measure or pour volume. The notches or stops 66 are arranged along a slidable rim 366 of the rotatable cylindrical fill ring 12, such that a volume to be measured can be selected by aligning the volume selector notch or stop 67 with the volumetric index 107 and corresponding volume selector notch or stop 67 on the exterior surface 91 of the outer wall 89 of the rotatable cylindrical fill ring 12.

Figure 5A:
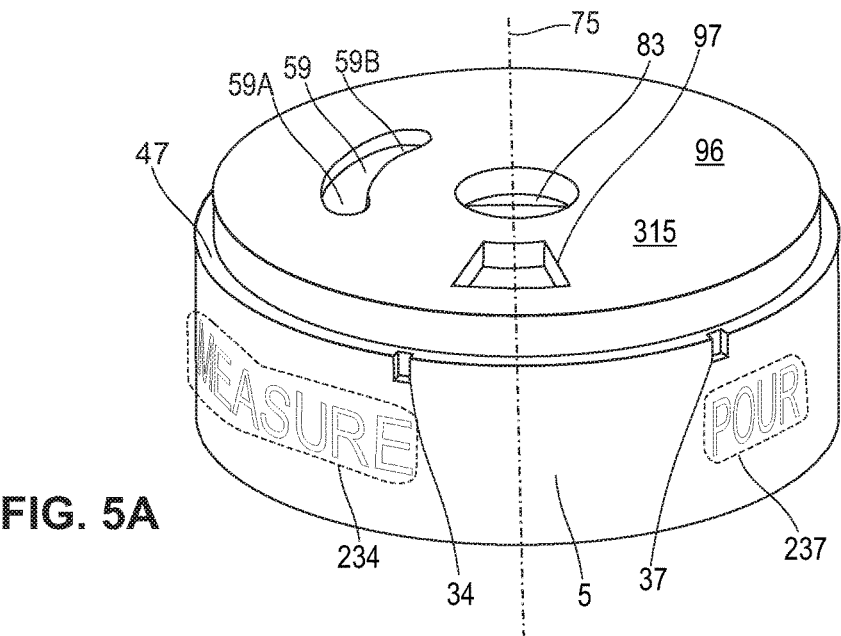
FIGS. 5A and 5B depict superior and inferior views of a base cylinder, in accordance with embodiments of the present invention.
Figure 5B:
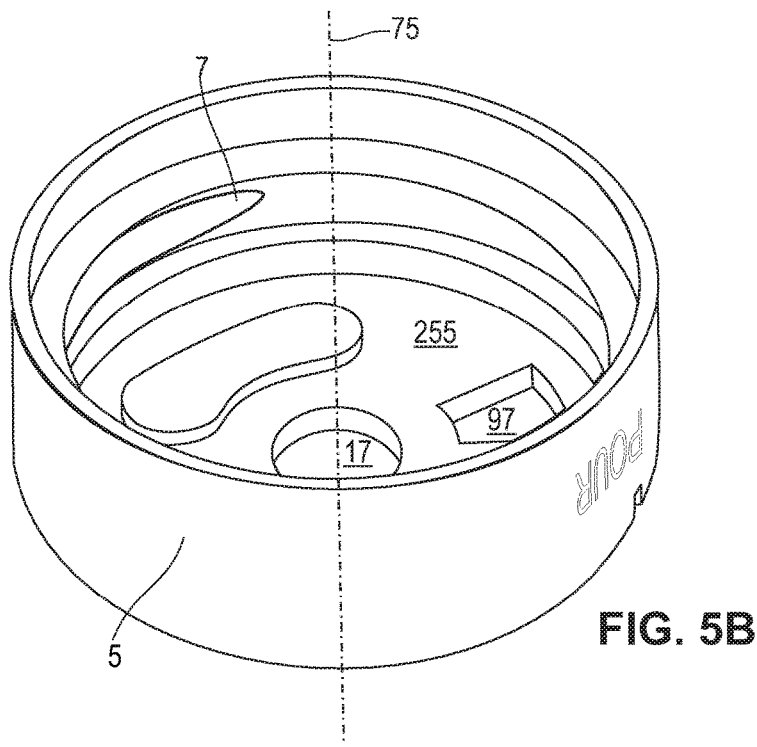

The cylindrical fill ring 12 is comprised of an opening 95 which intercommunicates with the measuring volume 69, depicted in FIG. 3B, of the rotatable measuring cylinder 11 and an opening 97 in a superior surface 96 of a base cylinder 5, depicted in FIGS. 5A and 5B, between the opening 10 in the neck 14 of a reservoir 9.

A blocker 49 having a solid shape extends from a superior surface 320 of the cylindrical fill ring 12 into the measuring volume 69, depicted in FIG. 3B, of the rotatable measuring cylinder 11. The blocker 49 has a proximal side 103 and a distal side 105, depicted in FIG. 6, relative to the opening 95 in the superior surface 320 of the rotatable cylindrical fill ring 12. The leaf partition 101 traverses a hollow cylindrical measuring compartment 79 of the rotatable measuring cylinder 11, depicted in FIG. 3B between the distal side 105 of the blocker 49 and the proximal side 103 of the blocker 49 when the rotatable measuring cylinder 11 is rotated, such that the volume selector notch or stop 67 is aligned with the selected volumetric indicia 107 and corresponding notches or stops 66.

Referring to FIG. 1, depicting the device 1, before assembly, the device 1 comprises a base cylinder 5. The base cylinder 5 comprises a superior surface 96 between the opening 10 in the neck 14 of the reservoir 9 and an inferior surface 325 of the rotatable cylindrical fill ring 12. An opening 97 in the superior surface 96 of the base cylinder 5 enables intercommunication of flowable particulates 2 with the opening 95 of the rotatable cylindrical fill ring 12 and the reservoir 9.

Figure 4A:
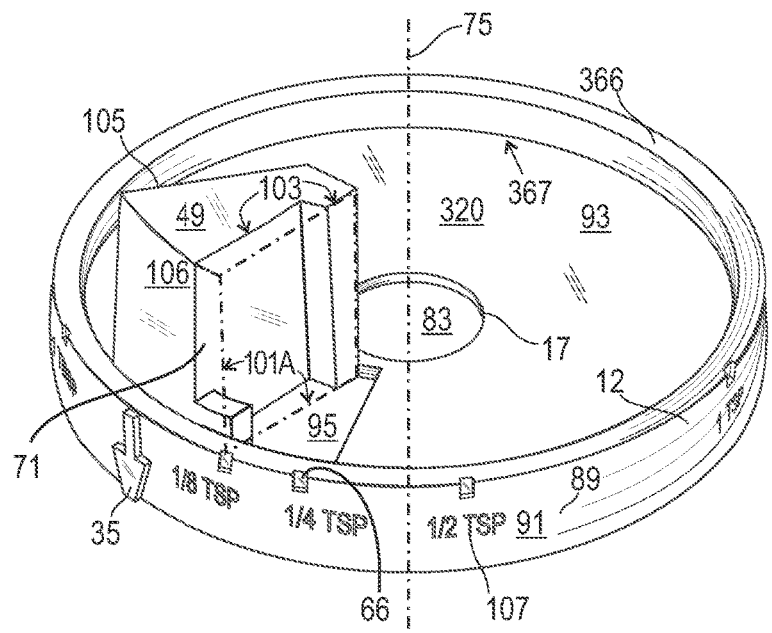
FIGS. 4A and 4B depict superior and inferior views of a rotatable cylindrical fill ring, in accordance with embodiments of the present invention.
Figure 4B:
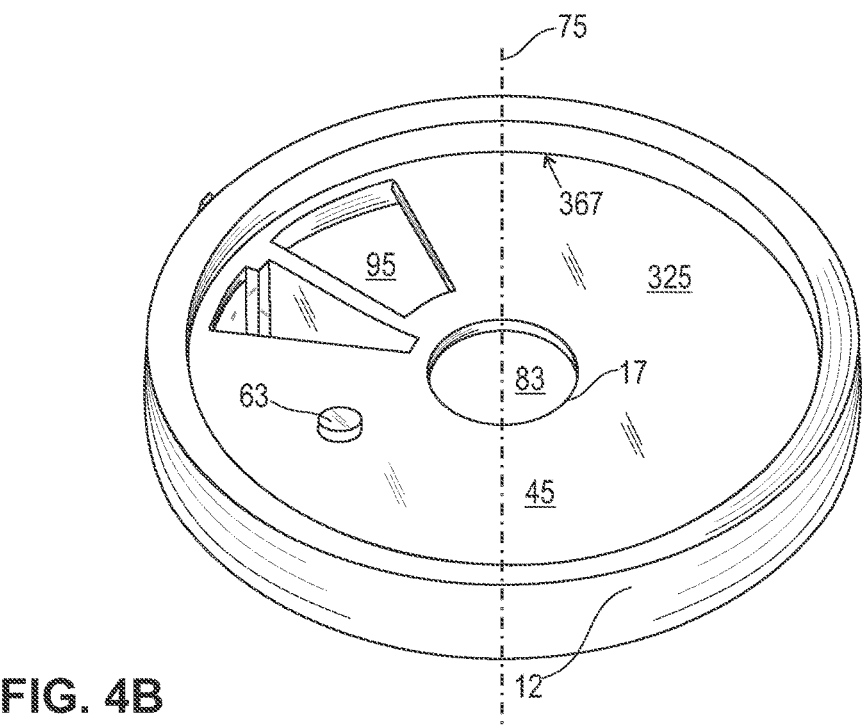

FIGS. 4A and 4B depict superior and inferior views of a rotatable cylindrical fill ring 12. The rotatable cylindrical fill ring 12 has an outer wall 89 with an exterior surface 91. Indices 107 and corresponding notches or stops 66, also depicted in FIG. 9B, setting off a range of desired measure or pour volumes for granules or powders from ⅛ teaspoon-1 tablespoon on the exterior surface 91 of the outer wall 89 of the rotatable cylindrical fill ring 12, may be aligned with a corresponding volume selector notch or stop 67, depicted in FIG. 9B, setting off a position of the leaf partition 101, such that the measuring volume 69 corresponds to the selected measure or pour volume. The notches or stops 66 are arranged along the slidable rim 366 of the rotatable cylindrical fill ring 12, also depicted in FIG. 1, such that a volume to be measured can be selected by aligning the volume selector notch or stop 67 with the volumetric index 107 and corresponding volume selector notches or stops 66 on the exterior surface 91 of the outer wall 89 of the rotatable cylindrical fill ring 12.

The cylindrical fill ring 12 comprises an opening 95 which intercommunicates with the measuring volume 69 of the rotatable measuring cylinder 11 and an opening 97 in a superior surface 96 of a base cylinder 5 between the opening 10 in the neck 14 of a reservoir 9. One of the plurality of swivel holes 17 defines an opening in a center 83 of the rotatable cylindrical fill ring 12 for second insertion of the distal end 90 of the compressible fastener 18.

A blocker 49, depicted in FIG. 4A, having a solid shape extends from a superior surface 320 of the rotatable cylindrical fill ring 12 into the measuring volume 69 of the rotatable measuring cylinder 11, depicted in FIG. 3B. The blocker 49 has a proximal side 103 and a distal side 105 relative to the opening 95 in the rotatable cylindrical fill ring 12. The leaf partition 101 traverses the hollow cylindrical measuring compartment 79 of the rotatable measuring cylinder 11, depicted in FIG. 3B, between the distal side 105 of the blocker 49 and the proximal side 103 of the blocker 49 when the rotatable measuring cylinder 11 is rotated, such that the volume selector notch or stop 67, depicted in FIG. 1, may be aligned with the selected volumetric indicia 107 and stops or notches 66 on the surface 91 of the wall 89 of the rotatable cylindrical fill ring 12.

Figure 8A:
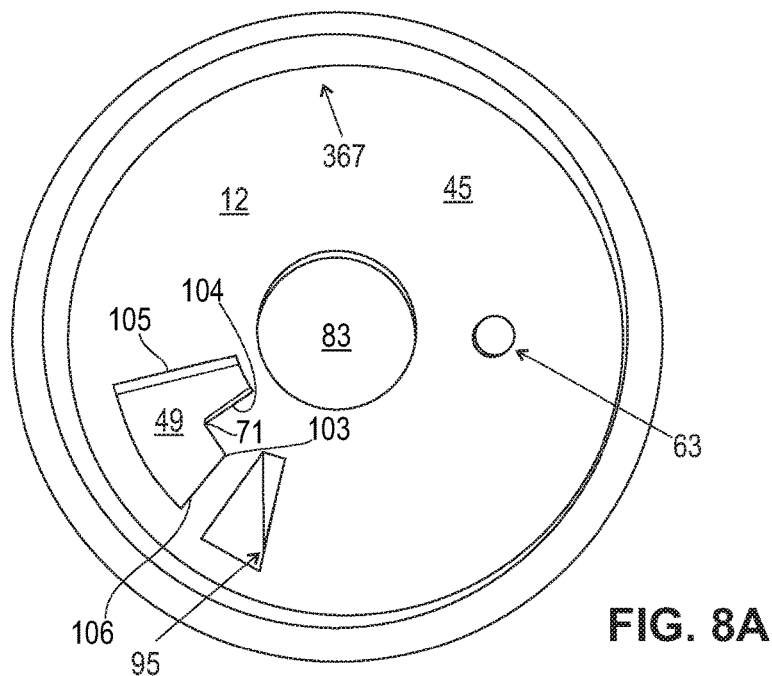
FIGS. 8A and 8B depict an inferior view of the rotatable cylindrical fill ring and a superior view of the base cylinder, in accordance with embodiments of the present invention.

Referring to FIGS. 4A and 8A, in one embodiment, a minimum measuring volume may be formed in the hollow cylindrical measuring compartment 79 by creating a cavity 71. In this embodiment, the proximal side 103 of the blocker 49 of the of the rotatable cylindrical fill ring 12 is adapted to have a concave portion 106 with respect to a first portion 104 that radiates from the center 83 of the rotatable cylindrical fill ring 12. The concave portion 106 creates a reproducibly fixed minimum measuring volume when the leaf partition 101 of the rotatable measuring cylinder 11 is adjacent to the proximal side 103 of the blocker 49. The cavity 71 is bounded by the proximal side 103 of the blocker 49 and the leaf partition 101 when the rotatable measuring cylinder 11 has been rotated, such that the leaf partition 101 abuts surface 104 of the proximal side 103 of the blocker 49, creating a fixed minimum measuring volume that provides reproducible measurement the granules or powders within +/−10% by volume for the smallest volumetric index 107.

Referring to FIG. 1, in one embodiment the surface 320 of the rotatable cylindrical fill ring 12 facing the rotatable measuring cylinder 11 and the inferior surface 325 of the cylindrical fill ring 12, respectively, are slidably recessed 367 with respect to the outer wall 89 of the rotatable cylindrical fill ring 12, such that the outer wall 89 of the rotatable cylindrical fill ring 12 overlaps outer wall 38 of the rotatable measuring cylinder 11 and outer wall 33 of the base cylinder 5, as in a male-female relationship.

FIGS. 5A and 5B depict superior and inferior views of a base cylinder 5. The base cylinder 5 comprises a superior surface 96 between the opening 10 in the neck 14 of the reservoir 9 and an inferior surface 325 of the rotatable fill ring 12. The superior surface 96 comprises an intercommunicating opening 97 between the opening 95 in the rotatable cylindrical fill ring 12 and the reservoir 9. One of the plurality of swivel holes 17 defines an opening in a center 83 of the superior surface 96 for third insertion of the distal end 90 of the compressible fastener 18, where one of the plurality of swivel holes 17 of the superior surface 96 is for the third insertion of the distal end 90 of the compressible fastener 18.

In one embodiment, depicted in FIGS. 4A and 4B, the superior surface 320 of the rotatable cylindrical fill ring 12 facing the rotatable measuring cylinder 11 and the inferior surface 325 of the cylindrical fill ring 12, respectively, are slidably recessed 367 with respect to the outer wall 89 of the rotatable cylindrical fill ring 12, such that the outer wall 89 of the rotatable cylindrical fill ring 12 overlaps outer wall 38 of the rotatable measuring cylinder 11, as in a male-female relationship.

In like manner, in the same embodiment, depicted in FIGS. 5A and 5B, the outer wall 33 of the base cylinder 5 is slidable recessed 47 with respect to the superior surface 315 of the base cylinder 5, for nesting with the inferior surface 325 in the slidable recess 367 of the rotatable cylindrical fill ring 12, as in a male-female relationship.

In one embodiment, the assembled device 1 comprises a cylindrical fill ring 12, depicted in FIG. 4A, having a selector arrow 35 affixed to its exterior surface 89 and the base cylinder 5, depicted in FIG. 5A, having "measure" or "pour" indicia 234, 237 affixed to its exterior surface 33 and respective stops or notches 34, 37 along a slidable recess 47. The slidable recess 47 is provided in wall 33 of the base cylinder 5 for nesting in the inset 367 in the inferior surface 325 of the rotatable cylindrical fill ring 12. The openings 95 and 97 may be aligned for measuring the granules or powders from the device 1 by aligning the selector arrow 35 with the "measure" index 234 and the respective stop or notch 34. Alternatively, the openings 95 and 97 may be aligned for pouring the granules or powders from the device 1 by aligning the selector arrow 35 with the "pour" index 237 and the respective stop or notch 37. In this embodiment, referring to FIG. 5A, the base cylinder 5 comprises a semicircular concavity 59 running circumferentially along the superior surface 315 of the base cylinder 5, having end 59A end 59B. Referring to FIG. 4B, the convex circular button 63 on the inferior surface 325 of cylindrical fill ring 12 may slide from one end 59A to the other end 59B of the semicircular concavity 59, such that the openings 95 and 97 may be aligned for measuring or not aligned for pouring the granules or powders from the device 1. The range of desired measure or pour volumes for granules or powders to be obtained from reservoir 9 may be from ⅛ teaspoon-1 tablespoon. Changing from "measuring" to "pouring" and vice versa may be accomplished by rotating the cylindrical fill ring 12 and correspondingly rotating the arrow 35 of the rotatable cylindrical fill ring 12 from being aligned with the stop or notch 34 to being aligned with the stop or notch 37 by circumferentially sliding the convex circular button 63, found on the inferior surface 325 of the rotatable cylindrical fill ring 12, along the semicircular concavity 59 running circumferentially along the superior surface 315 of the base cylinder 5, from end 59B to end 59A, and vice versa.

FIG. 5B depicts an inferior view of the base cylinder 5, with the compressible fastener 18 attached to the center of the inferior side 98, illustrating a releasable coupling 24 formed, e.g., when the prongs 20 are inserted into the plurality of swivel holes 17. In one embodiment, the base cylinder 5 is rotatably releasably operably coupled to the reservoir 9 by means of a set of internal threads 7. In one embodiment, the reservoir 9 is a spice jar.

Figure 5C:
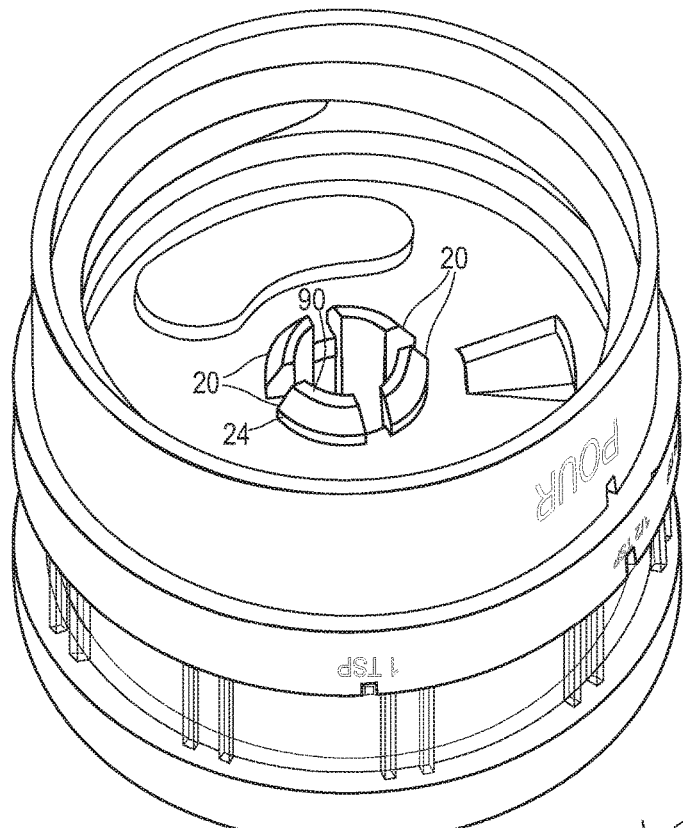
FIG. 5C depicts an inferior view of the device depicted in FIG. 1, after assembly, in accordance with embodiments of the present invention.

FIG. 5C depicts an inferior view of the device 1 depicted in FIG. 1, after assembly of the device 1. In one embodiment, the compressible fastener 18 is rotatable capable of resisting insertion into or release from the plurality of swivel holes 17 because of resistance of the outwardly flared prongs 20 to expansion or compression when the outwardly flared prongs 20 are inserted into the plurality of swivel holes 17.

In one embodiment, the compressible fastener 18 is rotatable in the swivel hole 17 and capable of resisting insertion into or release from the plurality of swivel holes 17 because of resistance of the outwardly flared prongs 20 to expansion or compression when the outwardly flared prongs 20 are inserted into the plurality of swivel holes 17. Therefore a releasable coupling 24 is formed, e.g., when the prongs 20 are inserted into the plurality of swivel holes 17.

Figure 7:
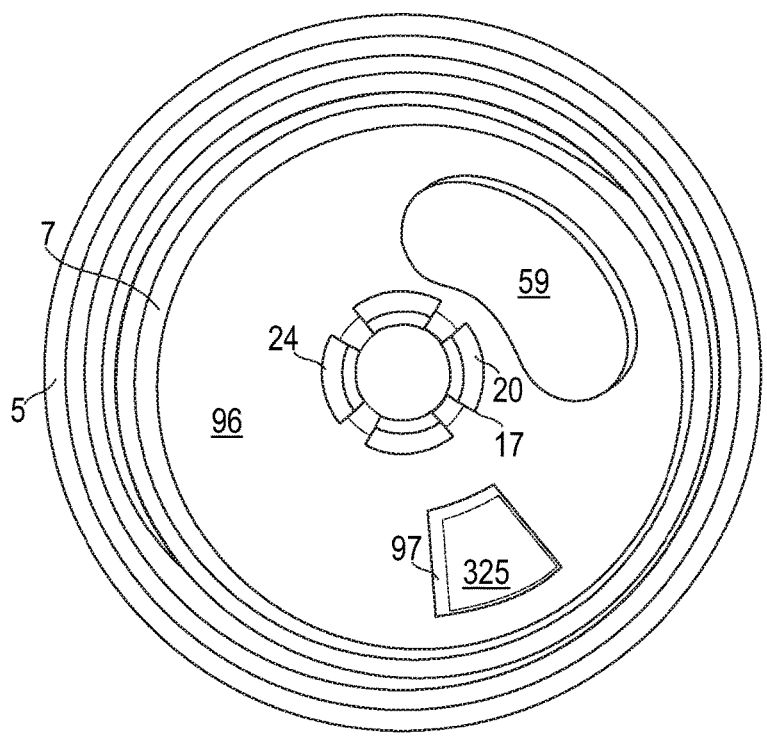
FIG. 7 depicts an inferior view of the base cylinder, in accordance with embodiments of the present invention.
Figure 9A:
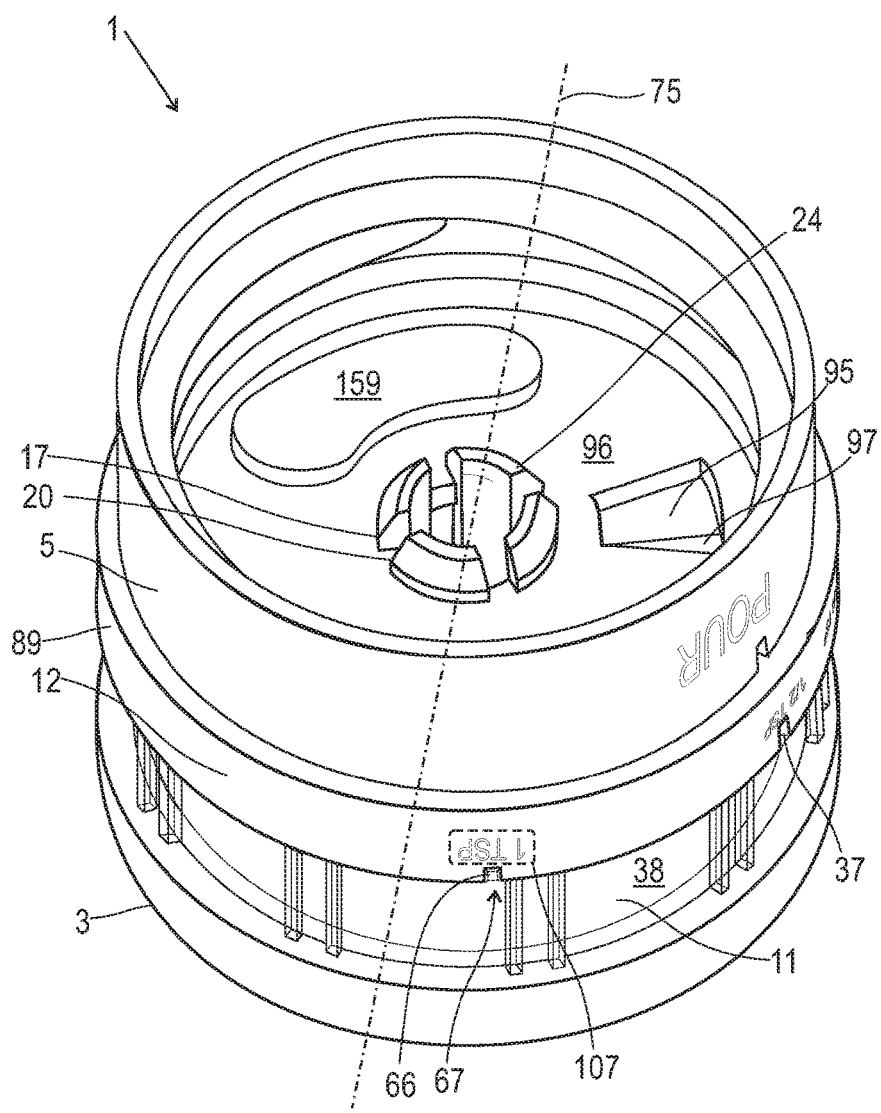
FIGS. 9A and 9B depict inferior and superior views of the device depicted in FIG. 1, after assembly, in accordance with embodiments of the present invention.

FIG. 5B and FIG. 7 depict an inferior view of the device depicted in FIG. 1, before assembly of the device 1. FIG. 9A depicts the inferior view of the device 1 depicted in FIG. 1, after assembly of the device 1. A raised surface extends from the inferior surface 255 of the base cylinder 5 forming a body 159 of the semicircular concavity 59 that runs circumferentially along the superior surface 315 of the base cylinder 5.

Figure 6:
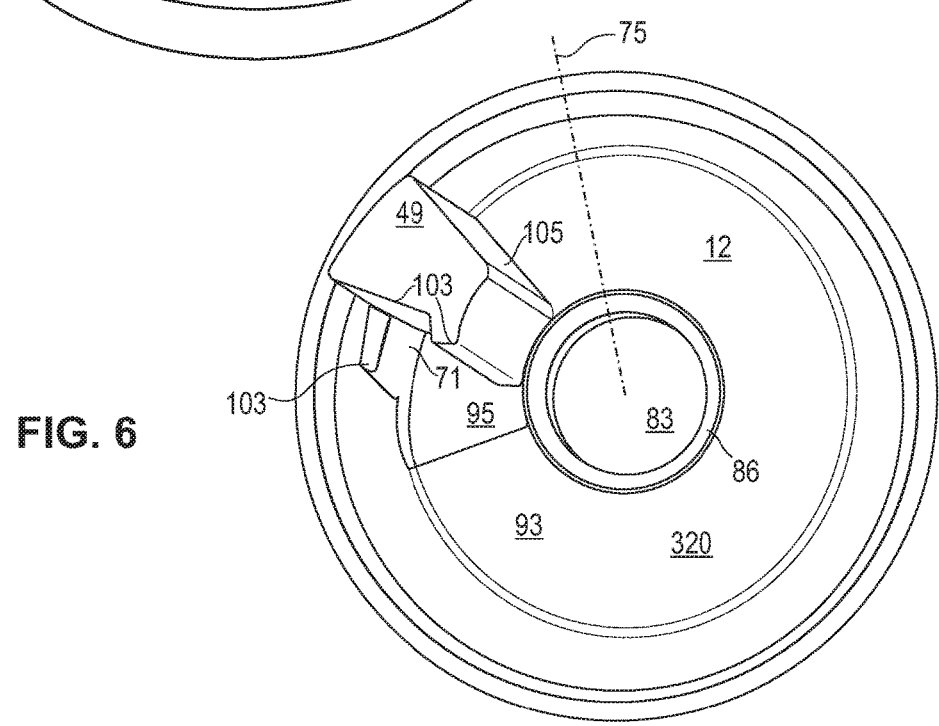
FIG. 6 depicts a superior view of the rotatable cylindrical fill ring, in accordance with embodiments of the present invention.

FIG. 6 depicts a superior view of the rotatable measuring cylinder 11 and superior view of the rotatable cylindrical fill ring 12.

In one embodiment the blocker 49 and the leaf partition 101 are made from plastic.

In one embodiment the blocker 49 and the leaf partition 101 are hollow.

In one embodiment, a bearing 86 surrounds the swivel hole 17, for insertion of the distal end 90 of the compressible fastener 18, depicted in FIG. 2B.

In one embodiment, the rotatable measuring cylinder 11 is transparent or translucent.

In one embodiment, the graduated indices 107 on the surface 91 of the outer wall 89 of the rotatable cylindrical fill ring 12 may be denoted in teaspoons or tablespoons.

In one embodiment, the notches or stops 66 corresponding to the indices 107 may include ⅛ tsp, ¼ tsp, ½ tsp, 1 tsp, and 1 tbsp.

In one embodiment, the graduated indices 107 around the circumference of the device 1 may be denoted in milliliters.

In one embodiment, the graduated indices 107 around the circumference of the device 1 may be denoted in teaspoons, tablespoons, and milliliters.

FIG. 7 depicts an inferior view of the base cylinder 5, showing an outline of the semicircular concavity 59 in the superior surface 315 of the base cylinder 315. In one embodiment, the compressible fastener 18 is rotatable in the swivel hole 17 and capable of resisting insertion into or release from the plurality of swivel holes 17 because of resistance of the outwardly flared prongs 20 to expansion or compression when the outwardly flared prongs 20 are inserted into the plurality of swivel holes 17. Therefore a releasable coupling 24 is formed, e.g., when the prongs 20 are inserted into the plurality of swivel holes 17.

Inferior surface 325 of the rotatable cylindrical fill ring 12 is visible through intercommunicating opening 97 in the superior surface 96 of the base cylinder 5.

Figure 8B:
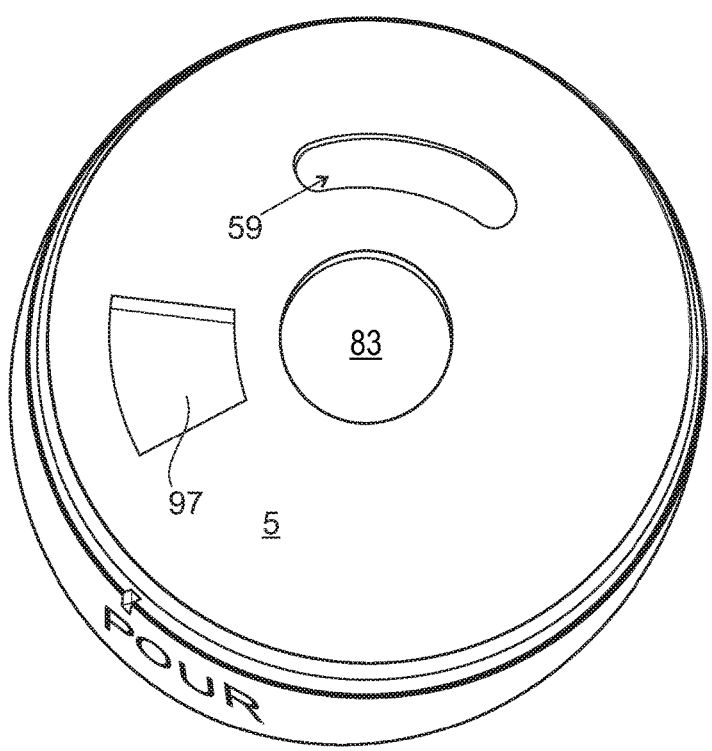

FIGS. 8A and 8B depict an inferior view of the rotatable cylindrical fill ring 12 and a superior view of the base cylinder 5.

Referring to FIGS. 4A and 8A, in one embodiment, a minimum measuring volume may be formed in the hollow cylindrical measuring compartment 79 by creating a cavity 71. In this embodiment, the proximal side 103 of the blocker 49 of the of the rotatable cylindrical fill ring 12 is adapted to have a concave portion 106 with respect to a first portion 104 that radiates from the center 83 of the rotatable cylindrical fill ring 12. The concave portion 106 creates a reproducibly fixed minimum measuring volume when the leaf partition 101 of the rotatable measuring cylinder 11 is adjacent to the proximal side 103 of the blocker 49. The cavity 71 is bounded by the proximal side 103 of the blocker 49 and the leaf partition 101 when the rotatable measuring cylinder 11 has been rotated, such that the leaf partition 101 abuts surface 104 of the proximal side 103 of the blocker 49, creating a fixed minimum measuring volume that provides reproducible measurement the granules or powders within +/−10% by volume for the smallest volumetric index 107.

FIG. 8B depicts the semicircular concavity 59 in the superior surface 315 of the base cylinder 315. Positioning the base cylinder 5 and the rotatable cylindrical fill ring 12 for either pouring 37 or measuring 33 is accomplished by circumferentially sliding the convex circular button 63 found on inferior surface 325 of the cylindrical fill ring 12, in the semicircular concavity 59 running circumferentially along the superior surface 315 of the base cylinder 5.

In one embodiment, the compressible fastener 18 is rotatable in the swivel hole 17 and capable of resisting insertion into or release from the plurality of swivel holes 17 because of resistance of the outwardly flared prongs 20 to expansion or compression when the outwardly flared prongs 20 are inserted into the ok swivel holes 17. Therefore a releasable coupling 24 is formed, e.g., when the prongs 20 are inserted into the plurality of swivel holes 17.

In one embodiment, the base cylinder 5 and the rotatable measuring cylinder 11 may be rotatably coupled by nesting in the slidable recesses 367 and 47, respectively. Nesting is provided because the superior surface 320 of the rotatable cylindrical fill ring 12 facing the rotatable measuring cylinder 11 and the inferior surface 325 of the rotatable cylindrical fill ring 12 facing the base cylinder 5, respectively are inset, respectively 367, 47 with respect to rim 366 of wall 89 of the rotatable cylindrical fill ring 12, and wall 33 of the base cylinder 5.

Referring to FIG. 3B, a slidable groove 365 is provided in wall 87 of the rotatable measuring cylinder 11 for nesting in the inset 367 in the superior surface 320 of the rotatable cylindrical fill ring 12 facing the rotatable measuring cylinder 11. In like manner, a slidable recess 47, depicted in FIG. 5A, is provided in wall 33 of the base cylinder 5 for nesting in the inset 367 in the inferior surface 325 of the rotatable cylindrical fill ring 12.

In one embodiment, the compressible fastener 18 is rotatable in the swivel hole 17 and capable of resisting insertion into or release from the plurality of swivel holes 17 because of resistance of the outwardly flared prongs 20 to expansion or compression when the outwardly flared prongs 20 are inserted into the plurality of swivel holes 17. Therefore a releasable coupling 24 is formed, e.g., when the prongs 20 are inserted into the plurality of swivel holes 17.

Figure 9B:
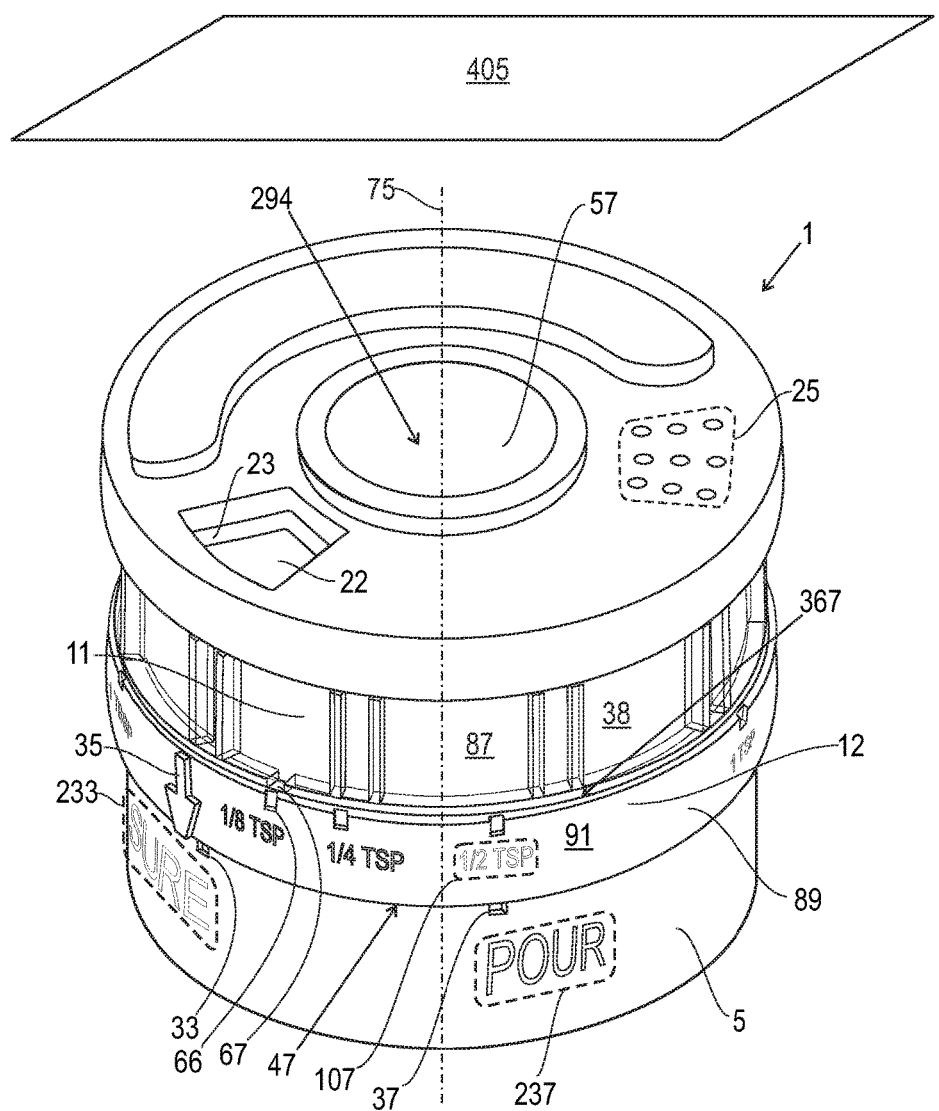

FIGS. 5C, 9A and 9B depict inferior and superior views of the device 1 depicted in FIG. 1, after operably coupling the rotatable cap 3, the rotatable measuring cylinder 11, the rotatable cylindrical fill ring 12; and the base cylinder 5, such that the rotatable cap 3, the rotatable measuring cylinder 11, the rotatable cylindrical fill ring 12; and the base cylinder 5 are mechanically or physically attached or joined, while preserving their operational, rotatable, releasable, or stationary functionality.

In one embodiment, the rotatable cap 3, rotatable measuring cylinder 11, rotatable cylindrical fill ring 12, and the base cylinder 5 are rotatably coupled by the compressible fastener 18 having been sequentially inserted through the plurality of swivel holes 17 located in the center 83 of the rotatable cap 3, the rotatable measuring cylinder 11, the rotatable cylindrical fill ring 12, and the base cylinder 5.

Figure 10:
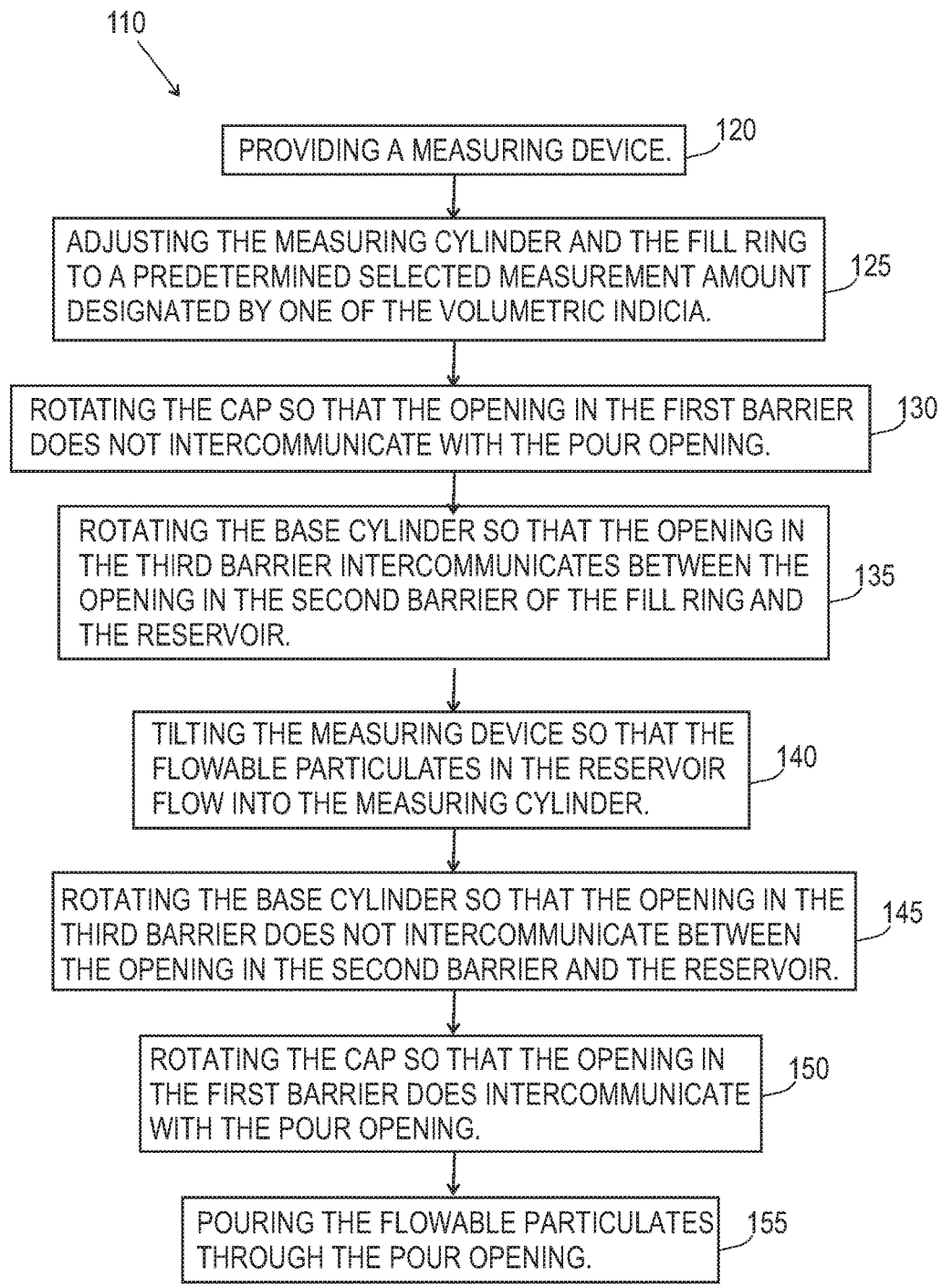
FIG. 10 depicts a flow scheme of a method 110 for measuring and dispensing flowable particulates, in accordance with embodiments of the present invention.
Figure 11:
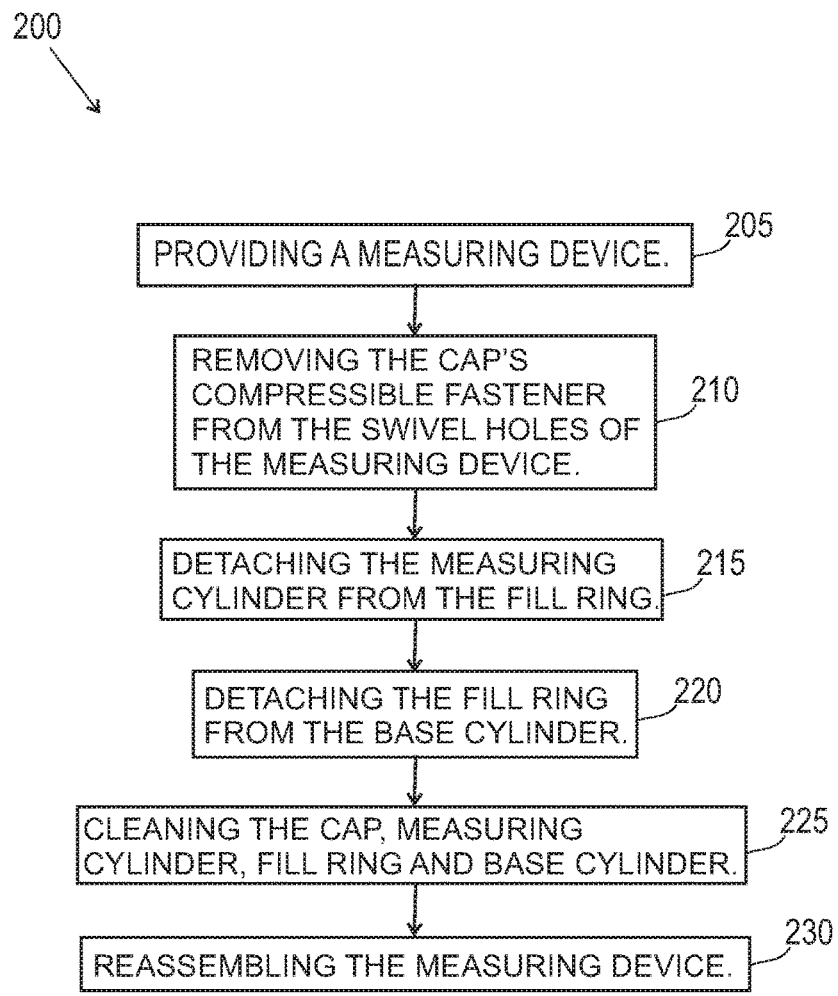
FIG. 11 depicts a flow scheme of a method 200 of cleaning and re-assembling the device 1, in accordance with embodiments of the present invention.

The device 1 may be used for measuring and dispensing predetermined volumes of dry powdered or dry granular materials 2, and methods 110, 200, depicted in FIGS. 10 and 11, and described herein for using the device 1 are disclosed. The device 1 comprises: a rotatable cap 3, a rotatable measuring cylinder 11, a rotatable cylindrical fill ring 12; and a base cylinder 5, such that the rotatable cap 3, the rotatable measuring cylinder 11, the rotatable cylindrical fill ring 12; and the base cylinder 5 are mechanically or physically attached or joined, while preserving their operational, rotatable, releasable, or stationary functionality. A rotatable leaf partition 101 and a blocker 49 form a measuring volume 79 between them within a predetermined volume from ¼ teaspoon (tsp.), ½ tsp, 1 tsp, or 1 tablespoon (tbsp.). A minimum measuring volume may be formed in a hollow cylindrical measuring compartment 79 by creating a cavity 71 that provides reproducible measurement of the flowable particulates 2, e.g., granules or powders, within +/−10% by volume The components of the device 1 may advantageously be made of a moldable foamed plastic, e.g., Styrofoam, or a moldable plastic, e.g. polyvinylchloride, silicone elastomer, organic elastomer, viton, sanoprene, or EPDM, or metal or metal alloy. In one embodiment, the components of the device 1 may advantageously be made of any appropriate plastic.

In one embodiment, FIG. 9B depicts the rotatable cap 3 advantageously comprises a magnet assembly 294. Referring to FIG. 1, the magnet assembly 294 comprises the magnet 57 embedded in magnet recess 73, lying in a plane below the surface 296 of the rotatable cap 3. The magnet 57 may be fixed in the magnet recess 73 by an adhesive. Alternatively, the magnet 57 may have a slightly wider diameter than the diameter of the magnet recess 73, such that the magnet 57 may be fixed in the magnet recess 73 by frictional forces arising from resistance to expansion of the material construction of the rotatable cap 3.

Example 1

FIG. 10 is a flow scheme depicting a method 110 for measuring and dispensing flowable particulates 2, e.g., granules or powders, using the device 1. Inferior and superior views of device 1, after assembly of the components shown in FIG. 1, are depicted in FIGS. 9A and 9B.

The method 110 comprises a step 120, providing the device 1; a step 125, selecting a measured volume between ⅛ tsp. And 1 tbl. by aligning the volume selector notch or stop 67 on the outer wall 38 of the rotatable measuring cylinder 11 and with a predetermined, selected measurement amount designated by one of the volumetric indicia 107 on the outer wall of 89 of the rotatable cylindrical fill ring 12; a step 130, rotating the rotatable cap 3 so that the opening 22 in the superior surface 300 of the rotatable measuring compartment 11 does not intercommunicate with the pour opening 23 or the grid opening 25; a step 135, rotating the cylindrical fill ring 12, so that the opening 97 in the superior surface 96 of the base cylinder 5 intercommunicates between the opening 95 of the rotatable cylindrical fill ring 12 and the reservoir 9; a step 140, tilting the device 1 so that the flowable particulates 2, e.g., granules or powders, in the reservoir 9 flow into the hollow cylindrical measuring compartment 79; a step 145, rotating the base cylinder 5 so that the opening 97 in the superior surface 96 does not intercommunicate between the opening 94 in the superior surface 320 and inferior surface 310 of the rotatable cylindrical fill ring 12 and the reservoir 9; a step 150, rotating the rotatable cap 3 so that the opening 22 in the superior surface 300 of the rotatable measuring compartment 11 does not intercommunicate with the pour opening 23; and a step 155, pouring the flowable particulates 2, e.g., granules or powders, through the pour opening 23.

The device 1 comprises: a rotatable cap 3, a rotatable measuring cylinder 11, a rotatable cylindrical fill ring 12; and a base cylinder 5, such that the rotatable cap 3, the rotatable measuring cylinder 11, the rotatable cylindrical fill ring 12; and the base cylinder 5 are mechanically or physically attached or joined, while preserving their operational, rotatable, releasable, or stationary functionality. A volume selector notch or stop 67 on the outer wall 38 of the hollow cylindrical measuring compartment 79 is aligned with a notch 66 on the outer wall 89 of the rotatable cylindrical fill ring 12, such that the position of the leaf partition 101 in the hollow cylindrical measuring compartment 79 corresponds to a measured volume that is selected for dispensing the measured flowable particulates 2, e.g., granules or powders. The rotatable leaf partition 101 and a blocker 49 form a measuring volume 79 between them within a predetermined volume from ¼ teaspoon (tsp.), ½ tsp, 1 tsp, or 1 tablespoon (tbsp.). A minimum measuring volume may be formed in a hollow cylindrical measuring compartment 79 by creating a cavity 71 having a reproducible measurement of the flowable particulates 2, e.g., granules or powders, within +/−10% by volume.

FIG. 11 is a flow scheme depicting a method 200 of cleaning and re-assembling a device 1. The method 200 comprises a step 205, providing the device 1; a step 210, removing the rotatable cap's 3 compressible fastener 18 from the plurality of swivel holes 17 of the device 1; a step 215, detaching the rotatable measuring cylinder 11 from the rotatable cylindrical fill ring 12; a step 220, detaching the rotatable cylindrical fill ring 12 from the base cylinder 5; a step 225, cleaning the rotatable cap 3, the rotatable measuring cylinder 11, the rotatable cylindrical fill ring 12, and the base cylinder 5; and a step 230, reassembling the device 1.

Figure 12:
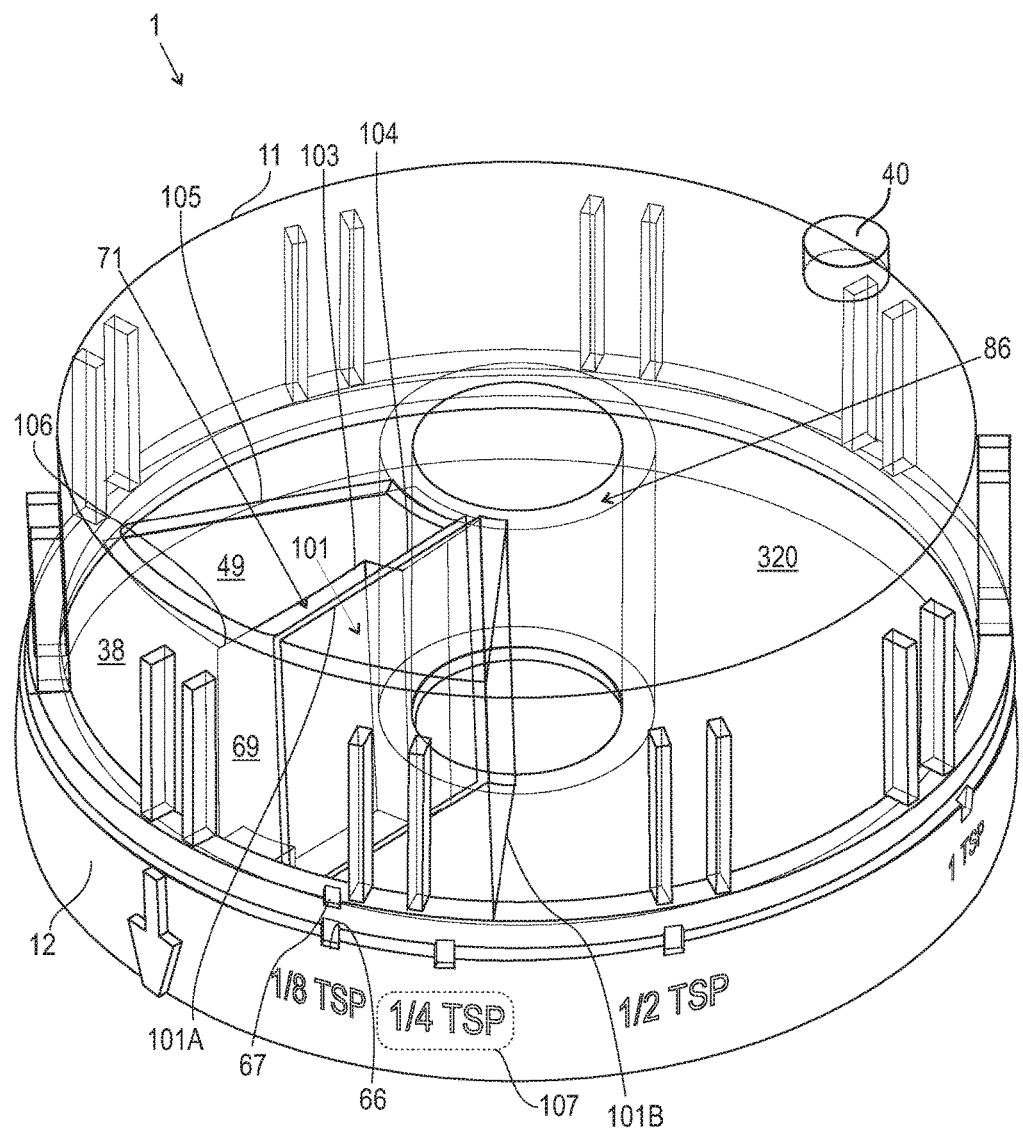
FIG. 12 depicts the superior view of the rotatable measuring cylinder, shown in FIG. 3A, and the superior view of the cylindrical fill ring, shown in FIG. 4A, after assembly, in accordance with embodiments of the present invention.

FIG. 12 depicts the superior view of the rotatable measuring cylinder, shown in FIG. 3A, and the superior view of the cylindrical fill ring, shown in FIG. 4A, after assembly. A minimum measuring volume, e.g., cavity 71 may be formed in the hollow cylindrical measuring compartment 79 of the rotatable measuring cylinder 11 by creating a cavity 71. In this embodiment, the proximal side 103 of the blocker 49 of the of the rotatable cylindrical fill ring 12 is adapted to have a concave portion 106 with respect to a first portion 104 that radiates from the bearing 86 of the rotatable cylindrical fill ring 12. The concave portion 106 creates a reproducibly fixed minimum measuring volume when a leaf 101A of the leaf partition 101, proximal to the blocker 49 of the rotatable measuring cylinder 11, is adjacent to the proximal side 103 of the blocker 49. The cavity 71 is bounded by the proximal side 103 of the blocker 49 and the leaf 101A of the leaf partition 101 when the rotatable measuring cylinder 11 has been rotated, such that the leaf 101A abuts surface 104 of the proximal side 103 of the blocker 49, creating a fixed minimum measuring volume that provides reproducible measurement the granules or powders within +/−10% by volume for the smallest volumetric index 107.

A blocker 49, depicted in FIG. 4A, having a solid shape extends from a superior surface 320 of the rotatable cylindrical fill ring 12 into the measuring volume 69 of the rotatable measuring cylinder 11, depicted in FIG. 3B. The blocker 49 has a proximal side 103 and a distal side 105 relative to the opening 95. The leaf partition 101 traverses the hollow cylindrical measuring compartment 79 of the rotatable measuring cylinder 11, depicted in FIG. 3B, between the distal side 105 of the blocker 49 and the proximal side 103 of the blocker 49 when the rotatable measuring cylinder 11 is rotated, such that the volume selector notch or stop 67, depicted in FIG. 1, may be aligned with the selected volumetric indicia 107 and stops or notches 66 on the surface 91 of the wall 89 of the rotatable cylindrical fill ring 12.

While exemplary embodiments have been specifically disclosed, it should be understood that the practice of this invention is not limited to those embodiments. Modifications and variations falling within the spirit of the invention will occur to those skilled in the art. Therefore, it is not intended that the scope of the invention be determined by the disclosed exemplary embodiments, but rather should be determined by the breadth of the appended claims.

I claim:

1. A device (1) adapted for measuring or pouring granules or powders, comprising:
  a rotatable cap (3) having an inferior surface (310) and a superior surface (296), comprising:
    a pour opening (23) in the surfaces (296, 310) of the rotatable cap (3); and
    a compressible fastener (18), seamlessly extending from the inferior surface (310) of the rotatable cap (3) along a longitudinal axis (75) of the device (1);
  a rotatable measuring cylinder (11) having a superior surface (300) and an inferior surface (400);
  a rotatable cylindrical fill ring (12); and
  a base cylinder (5),
    wherein the rotatable cap (3), rotatable measuring cylinder (11), the rotatable cylindrical fill ring (12), and the base cylinder (5) are rotatably coupled by the compressible fastener (18) having been sequentially inserted through a plurality of swivel holes (17) located in the center (83) of the rotatable measuring cylinder (11), the rotatable cylindrical fill ring (12), and the base cylinder (5),
    wherein the superior surface (300) of the rotatable measuring cylinder (11) is between the inferior surface (310) of the rotatable cap (3) and a hollow cylindrical measuring compartment (79),
    wherein the superior surface (300) is circumferentially coextensive with a wall (87) of the hollow cylindrical measuring compartment (79),
    wherein an opening (22) in the rotatable measuring cylinder (11) intercommunicates with the pour opening (23) of the rotatable cap (3) and the hollow cylindrical measuring compartment (79),
    wherein one of the plurality of swivel holes (17) defines an opening in a center (83) of the rotatable measuring cylinder (11), for a first insertion of the distal end (90) of the compressible fastener (18) into the opening in the center (83) of the rotatable measuring cylinder (11), and wherein a bearing (86) surrounds the one of the plurality of swivel holes (17), wherein a leaf partition (101), radiates from the bearing (86) through a measuring volume (69) and fixedly coupled to the wall (101) of the hollow cylindrical measuring compartment (79), such that the leaf partition (101) revolves about the compressible fastener (18) when the rotatable measuring cylinder (11) is rotated, wherein a volume selector notch or stop (67) on an outer wall (38) of the hollow cylindrical measuring compartment (79) is aligned with a notch (66) on an outer wall (89) of the rotatable cylindrical fill ring (12), such that the position of the leaf partition (101) in the hollow cylindrical measuring compartment (79) corresponds to a measured volume that is selected for dispensing the measured granules or powders, wherein the wall (87) of the hollow cylindrical measuring compartment (79), the outer wall (38) of the hollow cylindrical measuring compartment (79) and a wall of the bearing (86) are concentric, wherein the outer wall of the rotatable cylindrical fill ring (12) has an exterior surface (91), wherein the exterior surface (91) of the outer wall (89) of the rotatable cylindrical fill ring (12) is indexed volumetrically, such that a volume to be measured can be selected by aligning the volume selector notch or stop (67) with the volumetric index (107) on the exterior surface (91) of the outer wall (89) of the rotatable cylindrical fill ring (12);

wherein the rotatable cylindrical fill ring (12) has an opening (95) which intercommunicates with the hollow rotatable measuring cylinder (11) and an opening (97) in a base cylinder (5) between an opening (10) in a neck (14) of a reservoir (9), wherein a second of the plurality of swivel holes (17), that defines an opening in a center (83) of the rotatable cylindrical fill ring (12) for a second insertion of the distal end (90) of the compressible fastener (18), wherein the rotatable cylindrical fill ring has a superior surface (320) underlying the rotatable measuring cylinder (11), wherein the superior surface (320) has a blocker (49) having a solid shape extending from the superior surface (320) of the rotatable cylindrical fill ring (12) into the rotatable measuring cylinder (11), wherein the blocker (49) has a proximal (103) side and a distal side (105) relative to the opening (95) in the superior surface (320) of the rotatable cylindrical fill rind (12), wherein the leaf partition (101) traverses the rotatable measuring cylinder (11) between the distal side (105) of the blocker (49) and the proximal side (103) of the blocker (49) when the rotatable measuring cylinder (11) is rotated, such that the volume selector notch or stop (67) is aligned with the notch 66 corresponding to the selected volumetric index (107), and wherein the base cylinder (5) has an opening (97) in the base cylinder (5) that intercommunicates between the opening (95) in the rotatable cylindrical fill ring (12) and the reservoir (9), and wherein the distal end (90) of the compressible fastener (18) is inserted into a third of the plurality of swivel holes (17), wherein the third of the plurality of swivel holes (17) defines an opening in a center (83) of the base cylinder (5) for a third insertion of distal end (90) of the compressible fastener (18).

2. The device of claim 1,
wherein the rotatable cap comprises a grid opening (25); and
wherein the inferior surface of the rotatable cap comprises a semi-circular slot for aligning an opening in the rotatable measuring cylinder (11) with either the pour opening (23) or the grid opening (25) by circumferentially sliding a convex circular button in the semi-circular slot running circumferentially along a circumference of the inferior surface,
wherein the semi-circular slot runs circumferentially along the inferior surface of the rotatable cap (3), and
wherein the convex circular button protrudes from a superior surface (300) of the rotatable measuring cylinder (11).

3. The device of claim 1, wherein the blocker (49) has a proximal side (103), wherein the proximal side of the blocker of the rotatable cylindrical fill ring is adapted to have a reproducibly fixed minimum measuring volume when the leaf partition of the rotatable measuring chamber is adjacent to the proximal side of the blocker.

4. The device of claim 1, wherein a first surfaces of an inferior sides facing the measuring compartment and the base cylinder (5), respectively are inset in a female relationship to the measuring compartment and the base cylinder (5), so the outer wall of the rotatable cylindrical fill ring overlaps corresponding recessed portions of the outer wall of the rotatable measuring cylinder and the base cylinder.

5. The device of claim 1, wherein the base cylinder (5) has exterior indices which indicate whether the base cylinder and the rotatable cylindrical fill ring are positioned for either pouring or measuring.

6. The device of claim 1, wherein the compressible fastener (18) comprises an elongated stem (84) having a proximal end (85) and a distal end (90) that splits into outwardly flared prongs (20) that forms a releasable coupling for insertion into the plurality of swivel holes (17).

7. The device of claim 6, wherein, the compressible fastener (18) being rotatable capable of resisting insertion into or release from the plurality of swivel holes (17) because of resistance of the outwardly flared prongs (20) to expansion or compression when the prongs (20) are inserted into the plurality of swivel holes (17).

8. The device of claim 1, wherein graduated indices around a circumference are denoted in teaspoons or tablespoons.

9. The device of claim 8, wherein the graduated indices around the circumference include denotions in ⅛ tsp, ¼ tsp, ½ tsp, 1 tsp, and 1 tbsp.

10. The device of claim 1, wherein the rotatable cap has a small magnet embedded in the center.

11. The device of claim 10, wherein the small magnet (57) is operably coupled to a metallic shelf (405) for storage.

12. A method for storing the device of claim 10, comprising:
operably coupling the reservoir and device, and
attaching the assembly to a magnetic shelf (400).

13. The device of claim 1, wherein the rotatable measuring cylinder is transparent.

14. The device of claim 1, wherein the leaf partition (101) traverses the hollow cylindrical measuring compartment

(79) of the rotatable measuring cylinder (11), between the distal side (105) of the blocker (49) and the proximal side (103) of the blocker (49) when the rotatable measuring cylinder (11) is rotated, such that the volume selector notch or stop (67) is aligned with the selected volumetric indicia (107) and corresponding notches or stops (66).

15. The device of claim 1, wherein graduated indices are denoted in measuring volumes selected from the group consisting of teaspoons, tablespoons, and milliliters.

16. The device of claim 1, wherein the base cylinder (5) is rotatably releasably operably coupled to the reservoir (9) by means of a set of internal threads (7).

17. The device of claim 1,
wherein the base cylinder (5) comprises a slot (59) for aligning a convex circular button (63) in the rotatable cylindrical fill ring (12),
wherein the slot (59) is a concavity in the superior surface of the base cylinder, allowing either intercommunication between the base cylinder (5) and the reservoir (9) or not allowing intercommunication by circumferentially sliding the convex circular button (63) in the slot (59) running circumferentially along the superior surface (315) of the base cylinder (5), and
wherein the convex circular button protrudes from an inferior surface (255) of the rotatable cylindrical fill ring (12).

18. The device of claim 1, wherein the blocker and the leaf are hollow.

19. The device of claim 1, wherein the bearing (86) may seamlessly extend from an inferior surface (400) of the rotatable cylinder (11) around the swivel hole (17) in the center (83) of the rotatable measuring cylinder (11).

20. A method for measuring flowable particulates, comprising:
providing the device of claim 1;
adjusting the rotatable measuring cylinder and the rotatable cylindrical fill ring to the desired measurement;
rotating the rotatable cap, such that the opening in the superior surface of the rotatable cap does not align with the pour opening;
rotating the base cylinder, such that the opening in the inferior side intercommunicates between the opening in the inferior side of the rotatable cylindrical fill ring and the reservoir;
tilting the device, so that the flowable particulates move into the rotatable measuring cylinder;
rotating the base cylinder, such that the opening in the inferior side does not intercommunicate between the opening in the inferior side of the rotatable cylindrical fill ring and the reservoir;
rotating the rotatable cap, such that the opening in the superior surface does align with the pour opening;
pouring the flowable particulates out through the pour opening.

* * * * *